C. SHARPS.
Revolver.
No. { 94, / 1,199. }
Reissued June 18, 1861.
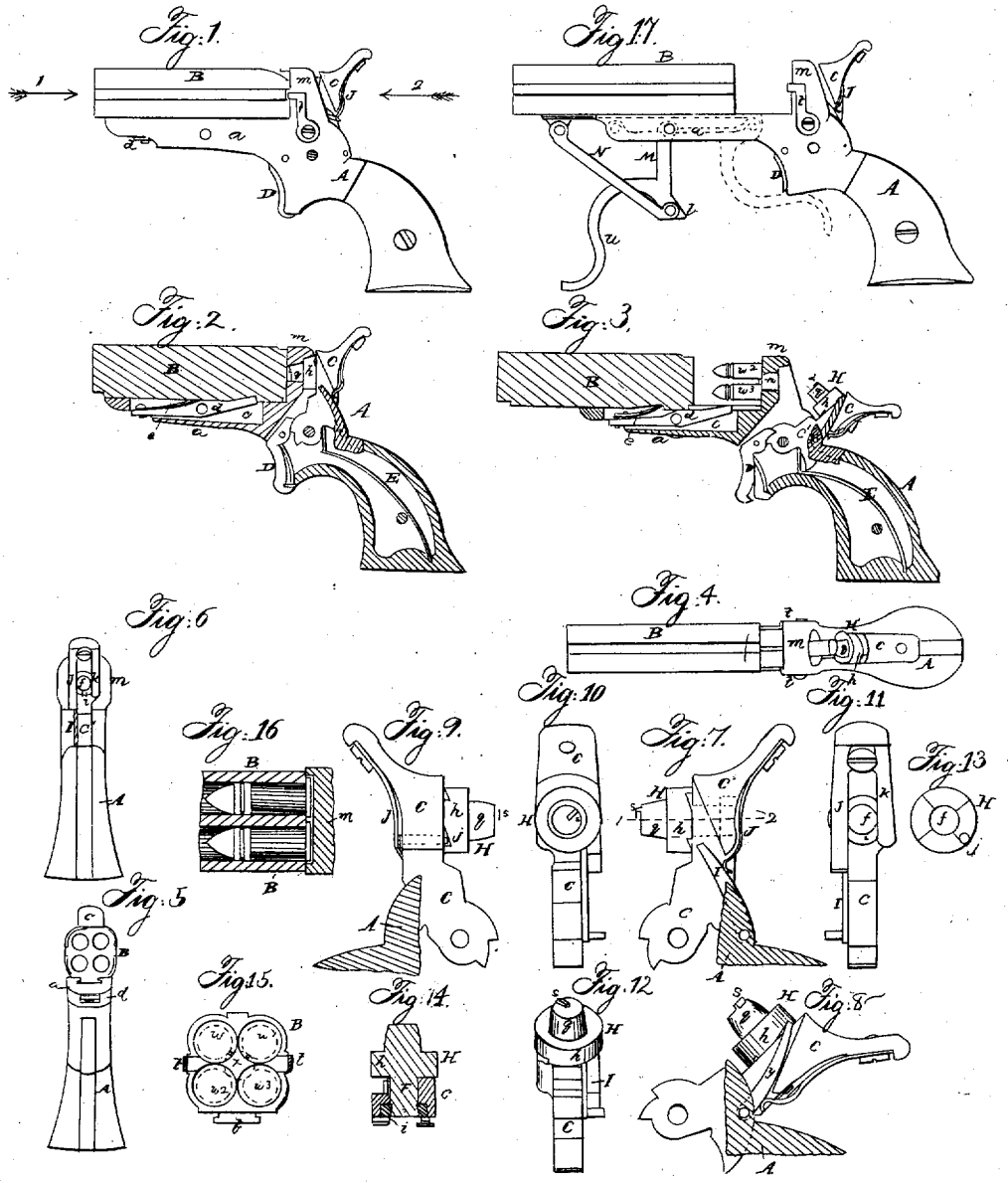
Witnesses
Henry Howson
Henry Odiorne
Inventor
Christian Sharps
N. PETERS, PHOTO-LITHOGRAPHER, WASHINGTON, D. C.

UNITED STATES PATENT OFFICE.

CHRISTIAN SHARPS, OF PHILADELPHIA, PENNSYLVANIA.

IMPROVEMENT IN BREECH-LOADING REPEATING FIRE-ARMS.

Specification forming part of Letters Patent No. 22,753, dated January 25, 1859; Reissue No. 1,199, dated June 18, 1861.

*To all whom it may concern:*

Be it known that I, CHRISTIAN SHARPS, of the city and county of Philadelphia, and State of Pennsylvania, have invented certain new and useful Improvements in Breech-Loading Fire-Arms; and I do hereby declare the following to be a full, clear, and exact description of the same, reference being had to the accompanying drawings, and to the letters of reference marked thereon.

My invention relates to improvements in breech-loading fire-arms in which one particular description of ammunition only is used—namely, a cartridge consisting of a case containing the powder with a bullet attached to one end of the case and an enlargement or projection at the opposite end for containing the detonating material.

My improvements consist, first, in discharging in succession a number of the above-mentioned cartridges by means of a projection caused to revolve by the movement of the hammer, the cartridges being so arranged in respect to the projection that the latter shall strike the edge only of each cartridge in succession; secondly, in a lever and connecting-rod arranged in respect to the barrel block and stock, as described hereinafter, for the threefold purpose of operating the barrel, locking and releasing the latter, and serving as a trigger-guard; thirdly, in a device, described hereinafter, whereby the spent metallic cartridges are withdrawn from the barrel during the act of moving the same out from the breech.

In order to enable others skilled in the art to make and use my invention, I will now proceed to describe its construction and operation.

On reference to the accompanying drawings, which form a part of this specification, Figure 1 is an exterior side view of my improved breech-loading fire-arm; Fig. 2, a longitudinal section of the same with the hammer down; Fig. 3, a longitudinal section of the same with the hammer cocked and the barrel slid out; Fig. 4, a plan view; Fig. 5, an end view, looking in the direction of the arrow 1, Fig. 1; Fig. 6, an end view, looking in the direction of the arrow 2, Fig. 1; Fig. 7, a detached view, drawn to an enlarged scale, of the hammer when down; Fig. 8, the same view of the hammer when cocked; Fig. 9, a side view of the hammer, the reverse of that illustrated in Fig. 7; Fig. 10, a front view of the hammer; Fig. 11, a rear view of the hammer; Fig. 12, a front view of Fig. 8; Fig. 13, a rear view of the revolving nipple, showing the notches and retaining-pin; Fig. 14, a sectional plan of the hammer with its revolving nipple on the line 1 2, Fig. 7; Fig. 15, a view showing the end of the barrel-block with its four cartridges all having been discharged except one; Fig. 16, a sectional view of the barrel through two of the bores and front of the breech; Fig. 17, an exterior view of the pistol, showing a lever arrangement for operating, locking, and releasing the barrel.

Similar letters refer to similar parts throughout the several views.

A is the stock of the pistol, and B the barrel-block, which in this instance has two bores in the width of the block and two in the depth, the bores being at equal distances from a point, *x*, in the center of the block, as seen in Figs. 5 and 15. The under side of the barrel-block is made perfectly straight and true, so as to fit accurately on the edges of the projecting portion *a* of the stock, which has grooves adapted to receive the lips of the projection *b* on the under side of the barrel-block, this projection being of such a form as to retain the block in close contact with the projection *a* of the block, and to allow the former to slide freely longitudinally on the latter, but so that the one can have no vertical or lateral motion independent of the other. In the projecting portion *a* of the block, and between the grooves for receiving the lips of the projection *b*, a chamber or recess, *c*, is formed, and within the same is hung a catch-lever, *d*, having two arms, the end of one arm fitting into a notch on the under side of the barrel-block, where it is retained by a spring, *e*, attached to the end of the opposite arm of the lever and bearing against the under side of the barrel-block. The arm of the lever to which the spring is attached projects so far through an opening in the end of the projection *a* of the stock as to be easily elevated by applying the finger to it, thereby depressing the opposite arm and releasing the barrel-block, which can be slid outward until its notch comes in contact with the point of the spring, as seen in Fig. 3.

C is the hammer, D the trigger, and E the mainspring, of the fire-arm, all being arranged within a recess formed in the stock, the two former being hung to pins passing transversely through the stock, and the spring bearing with its point in an angular recess formed in the hammer.

H is the revolving nipple, the pin *f* of which (see Fig. 14) fits snugly but so as to turn freely in an orifice in the hammer C, to which it is confined on one side by a collar, *h*, which forms part of the nipple, and on the opposite side by a nut, *i*, which fits into a recess in the rear of the hammer, and which screws onto or is otherwise secured to the end of the pin *f*. On the inside of the collar *h* of the revolving nipple, and where it bears against the hammer, are cut four radial notches (see Fig. 13) at equal distances apart, and inclined on one side and abrupt on the other. A pin, *j*, Figs. 9 and 13, passes freely through an orifice in the hammer, and is caused by means of a spring, *k*, to bear with its point against the inside of the collar *h* of the revolving nipple, where it rests at the deepest point of one of the radial notches of the collar, and thus serves to retain the said revolving nipple H in a given position prior to its being moved therefrom by the cocking of the hammer, as explained hereinafter.

To a pin secured to the stock is hung a catch or hand, I, the point of which is adapted to the radial notches on the collar *h*, in gear with one or other of which it is maintained by a spring, J, secured to the back of the hammer. This hand is so arranged in respect to the notches that it rests, when the hammer is down, on a projection on the stock, the point being then clear of the said notches. When the hammer, however, is in the act of being drawn back, the rear of the collar *h* is brought in contact with the hand, the point of the latter fitting into one of the radial notches and turning the rotating nipple, so that when the hammer has reached the position of full-cock the nipple will have been turned one-quarter of its circumference round, and in this position it is retained by the pin *j* during the descent of the hammer, when the hand I, by the action of the spring J, recovers its former stationary position on the stock until the hammer is again cocked, when the rotating nipple will be moved another quarter of its circumference round, as before.

In the breech *m*, which projects from and forms a part of the stock, is a circular opening, *n*, for the free admission of the end *q* of the revolving nipple H when the hammer is down, the center of the opening *n* coinciding with that of the nipple, and the centers of both coinciding with the central point, *x*, (Figs. 5 and 15,) of the barrel-block. On the face of the end of the rotating nipple is a projection, *s*, radiating from the center of the nipple and terminating at the edge of the face. This projection is the immediate cause of the ignition of the detonating substance contained in the enlarged end of the cartridge.

It should be understood that one particular class of cartridges only is used in connection with my improved fire-arm. These cartridges consist of a capsule or casing of thin metal containing powder, a portion of the bullet being inserted and secured to one end, and the opposite end being enlarged, so as to form a collar or projection for preventing the cartridge from entering too far into the bore of the barrel and for containing the detonating material. In the breech *m* four circular recesses are formed, coinciding with the four bores, and into these recesses fit the enlarged ends of the cartridges when the barrel-block is brought home to the breech. The rear of each cartridge is thus covered by the breech, excepting a small portion of the edge, which is necessarily exposed at the central opening, *n*, as best observed on reference to Fig. 15.

On each side of the stock is secured a spring-catch, *t*, the ends of the catches being bent so as to project inward in front of the breech, a slight incision on each side of the barrel-block preventing the latter, when moved toward the breech, from interfering with the points of said catches, which are so constructed and situated that when the barrel, with its cartridges, is brought up to the breech the bent end of one catch shall pass between the enlarged ends of the upper and lower cartridges and the barrel on one side and the end of the opposite catch between the enlarged ends of the upper and lower cartridges and the barrel on the opposite side, as seen in Fig. 15, the points of the clips assuming this position without any other aid than the pressure of the enlarged ends of the cartridges against them when the barrel is brought home to the breech. The barrel-block being slid forward to the position shown in Fig. 3, the hammer being cocked, and the cartridges being inserted into their respective bores, the block is pushed up to the breech, the heads of the cartridges fitting into the recess of the latter and the clips *t t* catching under the enlarged ends of the cartridges, the catch-lever *d* assumes its position in the notch on the under side of the barrel-block, when the pistol is ready for firing. When the trigger is drawn the projection *s* on the face of the hammer will strike on the edge of the enlarged portion of one cartridge only and cause the same to be discharged. When the hammer is again cocked, prior to a second discharge, the nipple must have turned, as hereinbefore described, one-quarter round, and the projection *s*, on account of its eccentricity with the center of rotation of the nipple, must consequently have been turned away from the cartridge upon which it acted last, and have assumed a position ready to act upon a second cartridge, and the position of the projections *s* changing every time the hammer is thrown back, each cartridge will be acted upon in succession until the whole are discharged. The end of the catch-lever *d*, which projects through the end of the stock, is then elevated and the barrel released and pushed forward.

In doing this the catches *t t* maintain their hold on the enlarged ends of the spent cartridges, the latter being withdrawn from their respective bores and dropping to the ground. It will be observed that as the barrel is being moved away from the breech the cartridges are retained in their proper position for allowing the spring-catches *t t* to retain their hold on the heads of the cartridges. In fact, without the recesses, which thus steady the spent cartridges, the spring-catches would not have the desired effect. The pistol is now in a condition to receive a second supply of cartridges.

In adapting my improvements to the larger class of pistols it will facilitate the operation of loading to apply an extra power in sliding the barrel-block in and out. This is effected by the arrangement illustrated in Fig. 17. A lever, M, of which the trigger-guard *u* forms a part, is hung to a pin in the projecting portion *a* of the stock, and to this lever is hinged one end of the rod N, the opposite end of which is hinged to a projection on the under side of the barrel-block B. An angular projection, V, is formed on the lever M, and this projection is adapted to a notch in the under side of the barrel-block and near the rear of the same. When the latter is slid out from the breech the above-named parts will assume the position illustrated in the figure. When the barrel has to be brought up to the breech the operator draws the lever M to the position shown in dotted lines, when the projection V is fitted into the notch of the barrel and the bent portion of the lever assumes the character and duty of an ordinary trigger-guard. It will thus be seen that by the above-described arrangement three duties are performed—the operation of the barrel-block and the locking and releasing of the same.

Having now described the nature of my invention and the manner in which the same is carried into effect, I wish it to be understood that I do not desire to confine myself to the use of a barrel-block with four bores or to the precise devices herein described for altering the position of the projection *s*, inasmuch as a barrel-block with more or less than four bores may be used in connection with my improvements, and as different devices may be used for changing the position of the said projection.

It will be evident that the catch-lever *d* is applicable for locking and releasing a barrel-block with a single bore, as is also the lever arrangement shown in Fig. 17, and the clip for retaining the spent cartridges as the block is being moved out.

I therefore claim as my invention and desire to secure by Letters Patent—

1. Exploding in succession a number of cartridges of the class herein described by means of a projection caused to revolve by the movement of the hammer when the said cartridges are so arranged in respect to the said projection that the latter shall strike the edge only of each cartridge in sucession, as herein set forth.

2. I do not desire to claim broadly the employment of a lever with a projection for the double purpose of locking the barrel and sliding it in and out, as such a device is shown in Greener's English Patent No. 2,693 of 1854; but I claim the lever M, with its projection V and the rod N, in combination with the barrel-block and its stock, when the whole is arranged as set forth, and when the lever M is so formed as to serve the purpose of a trigger-guard.

3. Causing the spent cartridges to be withdrawn from the barrel during the moving out of the latter by means of a clip or clips, *t*, applied and operating substantially as set forth.

In testimony whereof I have signed my name to this specification before two subscribing witnesses.

CHRISTIAN SHARPS.

Witnesses:
HENRY HOWSON,
JOHN WHITE.